United States Patent

Stemmle et al.

(10) Patent No.: US 10,062,479 B2
(45) Date of Patent: Aug. 28, 2018

(54) METHOD AND ARRANGEMENT FOR CONSTRUCTING A SUPERCONDUCTIVE CABLE SYSTEM

(71) Applicant: NEXANS, Paris (FR)

(72) Inventors: Mark Stemmle, Hannover (DE); Erik Marzahn, Langenhagen (DE)

(73) Assignee: NEXANS, Courbevoie (FR)

( * ) Notice: Subject to any disclaimer, the term of this patent is extended or adjusted under 35 U.S.C. 154(b) by 293 days.

(21) Appl. No.: 14/742,909

(22) Filed: Jun. 18, 2015

(65) Prior Publication Data

US 2015/0371739 A1 Dec. 24, 2015

(30) Foreign Application Priority Data

Jun. 24, 2014 (EP) .................................. 14 305 991

(51) Int. Cl.
*H01B 13/00* (2006.01)
*H02G 15/34* (2006.01)
*H01B 12/16* (2006.01)
*H02G 1/00* (2006.01)

(52) U.S. Cl.
CPC ............. *H01B 13/00* (2013.01); *H01B 12/16* (2013.01); *H02G 15/34* (2013.01); *H02G 1/00* (2013.01); *Y02E 40/648* (2013.01)

(58) Field of Classification Search
CPC ....... Y02E 40/648; Y02E 40/64; H01B 13/00; H01B 12/16
See application file for complete search history.

(56) References Cited

U.S. PATENT DOCUMENTS

| 6,861,138 B1 | 3/2005 | Pfaff et al. | |
| 2005/0067184 A1* | 3/2005 | Jang | H01R 4/68 174/125.1 |
| 2007/0023521 A1 | 2/2007 | Soika et al. | |
| 2007/0235211 A1* | 10/2007 | Soika | H01R 4/68 174/125.1 |

(Continued)

FOREIGN PATENT DOCUMENTS

| DE | 3438660 | 4/1986 |
| DE | 19518541 | 11/1995 |

(Continued)

OTHER PUBLICATIONS

JP 2011172322 A Translation.*

(Continued)

*Primary Examiner* — Brian King
(74) *Attorney, Agent, or Firm* — Sofer & Haroun, LLP

(57) ABSTRACT

A method for constructing a superconductive cable system is proposed. Using this method, at least one superconductive cable (2) is mounted in a tubular cryostat (3) serving for guiding a cooling agent by means of which the cryostat (3) equipped with the cable (2) and wherein the cable (2) and the cryostat (3) are transported to the placement location and both ends are connected to units. The cable (2) is mounted in a cryostat (3) which at both axial ends (3b, 3c) protrudes beyond the cable (2). The unit of cable (2) and cryostat (3) is transported to the placement location. The ends (3b, 3c) protruding beyond the cable (2) are cut to a predetermined length. The superconductive cable (2) and the cryostat (3) are subsequently connected to the units.

4 Claims, 1 Drawing Sheet

(56) References Cited

U.S. PATENT DOCUMENTS

2008/0086878 A1* 4/2008 Ashibe .................... H01R 4/68
                                                                                 29/869
2010/0275437 A1   11/2010 Soika et al.
2012/0053061 A1* 3/2012 Schmidt ................ H02G 15/34
                                                                                505/430

FOREIGN PATENT DOCUMENTS

| DE | 19907675 | | 9/2000 |
|----|----------|---|--------|
| EP | 1744409  | | 1/2007 |
| EP | 1887671  | | 2/2008 |
| JP | 2011172322 | | 9/2011 |
| JP | 2011172322 A | * | 9/2011 |
| JP | 2013140764 | | 7/2013 |
| WO | 2013/047897 | | 4/2013 |

OTHER PUBLICATIONS

International Search Report Dated Apr. 9, 2015.
European Search Report Dated Oct. 2, 2014.
Search Report Within an Office Action Dated Aug. 16, 2017.

* cited by examiner

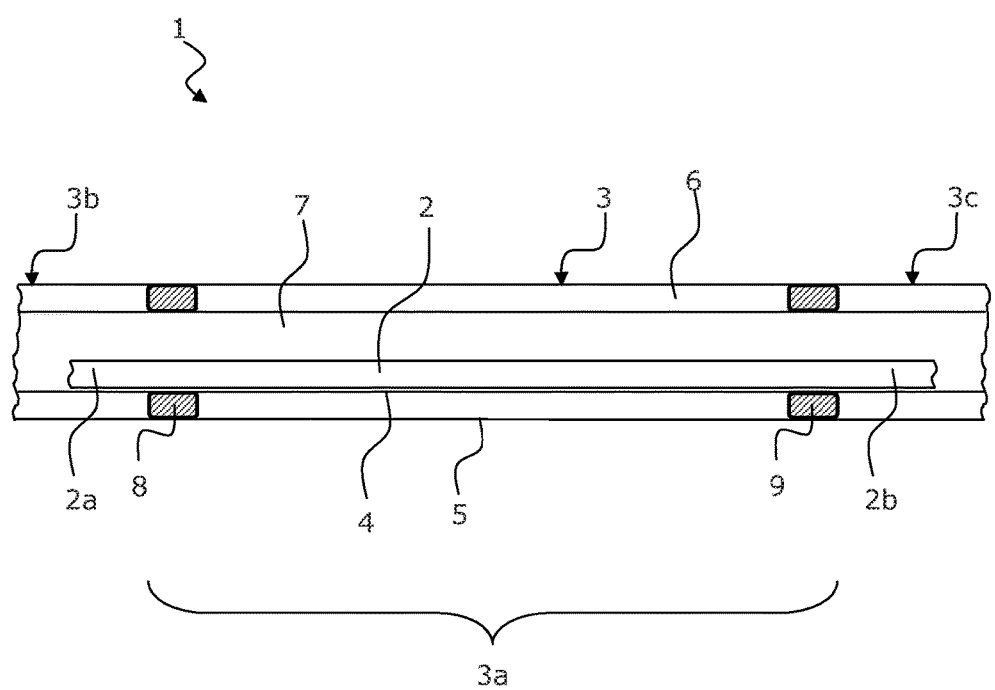

METHOD AND ARRANGEMENT FOR CONSTRUCTING A SUPERCONDUCTIVE CABLE SYSTEM

RELATED APPLICATION

This application claims the benefit of: priority from European Patent Application. No. 14 305 991.3, filed on Jun. 24, 2014, the entirety of which is incorporated by reference.

BACKGROUND

Field of the Invention

The invention relates to a method for constructing a superconductive cable system. Using this method, at least one superconductive cable is mounted in a tubular cryostat serving for guiding a cooling agent, by means of which the cryostat equipped with the cable is transported to a placement location, and wherein the cable and the cryostat are connected at the placement location at both ends to units, as well as an arrangement for constructing a superconductive cable system.

Description of Related Art

Superconductive cable systems are used, for example, in the energy supply of municipal networks, in Which the direct current resistance of the conductor is zero the cable systems permit the loss-free transmission of electrical energy over long distances. For cooling the superconductive cable, the cable is arranged in a cryostat. The cryostat includes at least one thermally insulated pipe through which a cooling agent suitable for operating the superconductive cable is conducted. The cooling agent is, for example, liquid helium or liquid nitrogen. The insulated pipe which surrounds the superconductive cable consists, for example, of two concentrically arranged metal pipes undulated and spaced apart at a distance from each other, which include a vacuum insulation and usually also other insulating materials. A cable cryostat can include one or more vacuum chambers arranged in series separated from each other by vacuum locks. The insulated pipe can also consist of a metal pipe surrounded by an insulation material.

At the ends of the superconductive cable system, end closures for connecting normal electric conductors of a current supply network or connecting pieces (also called sleeves) are secured to other superconductive cable systems. The end closures and sleeves can be equipped with access openings for connection to a cooling unit or a flow system for connecting a cooling unit to the flow system for the cooing agent.

When manufacturing such superconductive cable systems, the cryostat is prepared for connection to a cooling unit and evacuated over the required length of the unit. The prepared ends of the superconductive cable extend slightly beyond the cryostat for connection at the location of the cable placement. The completed superconductive cable system is usually wound on cable drums for storage and transportation. In order to protect the protruding cable ends against damage during storage, transportation and insulation, protective elements are provided. These protective elements may consist, for example, of undulated pipes placed over the cable ends. During the placement directly before the connection of the cable system, they are removed.

OBJECTS AND SUMMARY

It is the object of the invention to make available a method for constructing a superconductive cable system as well as a corresponding arrangement in which the cable ends are effectively protected during transportation and installation.

In accordance with the invention, this object is met in
that the cable is mounted in a cryostat which protrudes at both axial ends beyond the cable,
that the unit of cable and cryostat are transported to the placement location,
that the ends of the cryostat protruding beyond the cable are shortened at the placement location to a predetermined length, and
that the superconductive cable and the cryostat are connected to the units.

The method according to the invention, as well as the arrangement according to the invention, permit an effective protection of the ends of the superconductive cable during the storage and transportation of the cable system. Mounting a separate protective device at the cable system is unnecessary because the protruding ends of the cryostat already serve as protective pipes for the cable ends. Moreover, it is not necessary to know or manufacture the precise length of the cryostat during manufacture of the superconductive cable system. The cryostat is adapted to the required length only at the location of the cable system.

In accordance with a particularly advantageous embodiment of the method, a cryostat is used which consists of two pipes of metal which are arranged concentrically and at a distance from each other, and in which a vacuum insulation is mounted between the two pipes. A vacuum lock is arranged at the at least two positions arranged at an axial distance from each other. A vacuum is generated between these vacuum locks. Advantageously, the evacuation between the vacuum locks is already carried out at the location of manufacture. The protruding ends of the cryostat are then cut to the required length and are connected with the cable ends to the appropriate units.

BRIEF DESCRIPTION OF THE DRAWINGS

The method and the arrangement according to the invention are explained with the aid of the drawing.

FIG. 1 shows an embodiment of an arrangement for constructing a superconductive cable system.

DETAILED DESCRIPTION

The arrangement 1 according to the invention has a superconductive cable 2 and a tubular cryostat 3 into which the cable 2 has been placed. The construction of the superconductive cable 2 and its electrical connection to parts which extend further are not of significance here and, therefore, they will not be discussed in more detail here.

The cable cryostat 3 consists, in the illustrated embodiment of 2, of two pipes 4, 5 of metal arranged concentrically and at a distance from each other. For example, the metal pipes 4, 5 can be undulated in a direction transversely of their longitudinal direction. The metal pipes 4, 5 are held at a defined distance from each other by means of spacer members. In the intermediate space 6, between the metal pipes 4, 5, a vacuum insulation is mounted. The vacuum insulation is achieved on the one hand by evacuating the intermediate space 6, and on the other hand by the presence of an insulating material (not shown). The insulation material may, for example, consist of a plurality of stacked plastic foils which are coated on one side with metal, wherein the foils face outwardly in order to reflect any incoming heat by radiation.

The cryostat 3 surrounds the cable 2 as well as a free space 7 in which, in the state of operation, a flow-able cooling agent, for example liquid nitrogen or liquid helium, is guided in order to adjust and to hold the temperature of the superconductive cable 2, for example, to an operating temperature.

In accordance with the illustrated embodiment, the arrangement has two vacuum locks 8, 9 which are mounted at two positions between the two pipes 4, 5 in the cable cryostat 3. The vacuum locks 8, 9 each consist of a hermetic seal between the two pipes 4, 5. Such a partial piece 3*a*, for example, has a length of about 100 meters. The cryostat prepared at the place of manufacture may also comprise several vacuum chambers which are formed by several vacuum locks arranged at certain spacings.

In accordance with the invention, the cryostat 3 protrudes at both axial ends beyond the cable 2. The protruding ends 3*b*, 3*c* have at least such a length that they completely cover the cable ends 2*a*, 2*b*. The arrangement 1 is stored in this state and transported to the placement location in this state. For this purpose, the cryostat 3, provided with the cable 2, is wound up, for example, about a cable drum or a coil. Consequently, the cable ends 2*a*, 2*b* are therefore protected against damage during storage, transport and construction of the superconductive cable system by cryostat 3. At the location of placement, the arrangement 1 for constructing a superconductive cable system is then connected at both ends with units (not shown).

The units may consist, for example, of cable connecting pieces or cable end pieces. Thus, the superconductive cable 2 can be connected to a further conducting superconductive cable or to a normally conductive cable or through an appropriately constructed passage to an electrical device, for example, a current conducting network. The units have connecting points to connect to vacuum pumps. The cable connecting parts permit, for example, the flow of a cooling medium, while cable end pieces are suitable for arrangement in a cooling system, for example, a cooling agent reservoir.

For connection to the units, both ends 3*b*, 3*c* of the cryostat 3 are cut to a predetermined length. The cable ends 2*a*, 2*b* are connected by means of electrical connectors to further conductive cables. The respective ends of the metal pipes 4, 5 can then be connected, for example, by welding to appropriate connection pieces of the units. This creates two hermetically sealed chambers or rooms which, in comparison to the vacuum chamber of the partial piece 3*a* of the arrangement, are relatively small. These rooms or chambers can then be evacuated in a simple manner at the location of placement. For this purpose, a vacuum pump each is connected to the respective connecting point of the unit at the placement location.

Alternatively, the cable cryostat may also be composed of a pipe of metal provided with a thermal insulation. The thermal insulation may consist of, for example, vacuum panels or of foam insulation.

The invention claimed is:

1. A method of arranging and connecting a superconductive cable system to cooling units of an energy supply of a municipal network, said method comprising:
    mounting at least one superconductive cable in a tubular cryostat, the cryostat serving for guiding a cooling agent,
    transporting said cryostat, equipped with the cable to a placement location; and
    connecting both ends of both the cable and the cryostat to respective said cooling units of an energy supply of a municipal network,
    wherein the cable is mounted in a cryostat, the cryostat protruding at both axial ends of said cryostat beyond the ends of said superconductive cable, and
    wherein the ends of the cryostat, protruding beyond the ends of the superconductive cable, are shortened, after said cryostat and superconductive cable are at the placement location to a predetermined length.

2. The method according to claim 1, wherein
    said cryostat is composed of two metal pipes which are arranged concentrically at a distance from each other and, between the metal pipes, a vacuum insulation is arranged, and
    at least at two axial positions between the two pipes vacuum locks are mounted between which a vacuum is generated.

3. The method according to claim 2, wherein the vacuum locks are locked after the connection between the respective ends of the cryostat and the cooling units are evacuated.

4. The method according to claim 1, wherein said cryostat is provided with a thermal insulation.

* * * * *